(12) United States Patent
Byrne

(10) Patent No.: US 10,382,884 B1
(45) Date of Patent: Aug. 13, 2019

(54) DYNAMICALLY CONSUMING AND PUBLISHING SMART LOCATION INFORMATION BASED ON MOBILE IDENTITY

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/980,211

(22) Filed: May 15, 2018

(51) Int. Cl.
*H04W 4/02* (2018.01)
*H04W 8/24* (2009.01)
*H04W 12/06* (2009.01)

(52) U.S. Cl.
CPC ............. *H04W 4/02* (2013.01); *H04W 8/24* (2013.01); *H04W 12/06* (2013.01)

(58) Field of Classification Search
CPC .......... H04W 4/24; H04W 4/50; H04W 4/12; H04W 4/60; H04N 21/2541
See application file for complete search history.

(56) References Cited

U.S. PATENT DOCUMENTS

| | | | | |
|---|---|---|---|---|
| 7,945,251 B2* | 5/2011 | Jendbro | ............ | H04L 29/12066 340/573.1 |
| 8,762,559 B2* | 6/2014 | Engelhart | ............. | H04L 65/104 370/352 |
| 2012/0158769 A1* | 6/2012 | Gratton | ............. | G06F 17/30749 707/769 |
| 2014/0187267 A1* | 7/2014 | Yang | ........................ | H04W 4/80 455/456.3 |
| 2014/0200038 A1* | 7/2014 | Rao | ........................ | H04W 4/029 455/457 |
| 2014/0344294 A1* | 11/2014 | Skeen | .................. | H04L 65/4084 707/754 |
| 2016/0309209 A1* | 10/2016 | Lieu | .................... | H04N 21/2541 |

* cited by examiner

*Primary Examiner* — Diane D Mizrahi
(74) *Attorney, Agent, or Firm* — Lee & Hayes, P.C.

(57) ABSTRACT

A solution for dynamic consuming and publishing of smart location information using a mobile identity. Mobile identity information can refer to data relating to services that may be provided to a user of a mobile device, the mobile device, or another device or user. The mobile identity information can also refer to information that provides configurations, settings, setpoints, preferences, and the like to modify the service. Based on a receipt of such mobile identity information, a service can be configured for a user while maintaining a privacy of a user.

18 Claims, 4 Drawing Sheets

DYNAMICALLY CONSUMING AND PUBLISHING SMART LOCATION INFORMATION BASED ON MOBILE IDENTITY

BACKGROUND

Through interactions between and among users and various services, mobile devices collect and store information relative to the operation of the mobile device and the preferences/settings of the users. Over a period of time, the mobile device may be considered an entity having an identity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
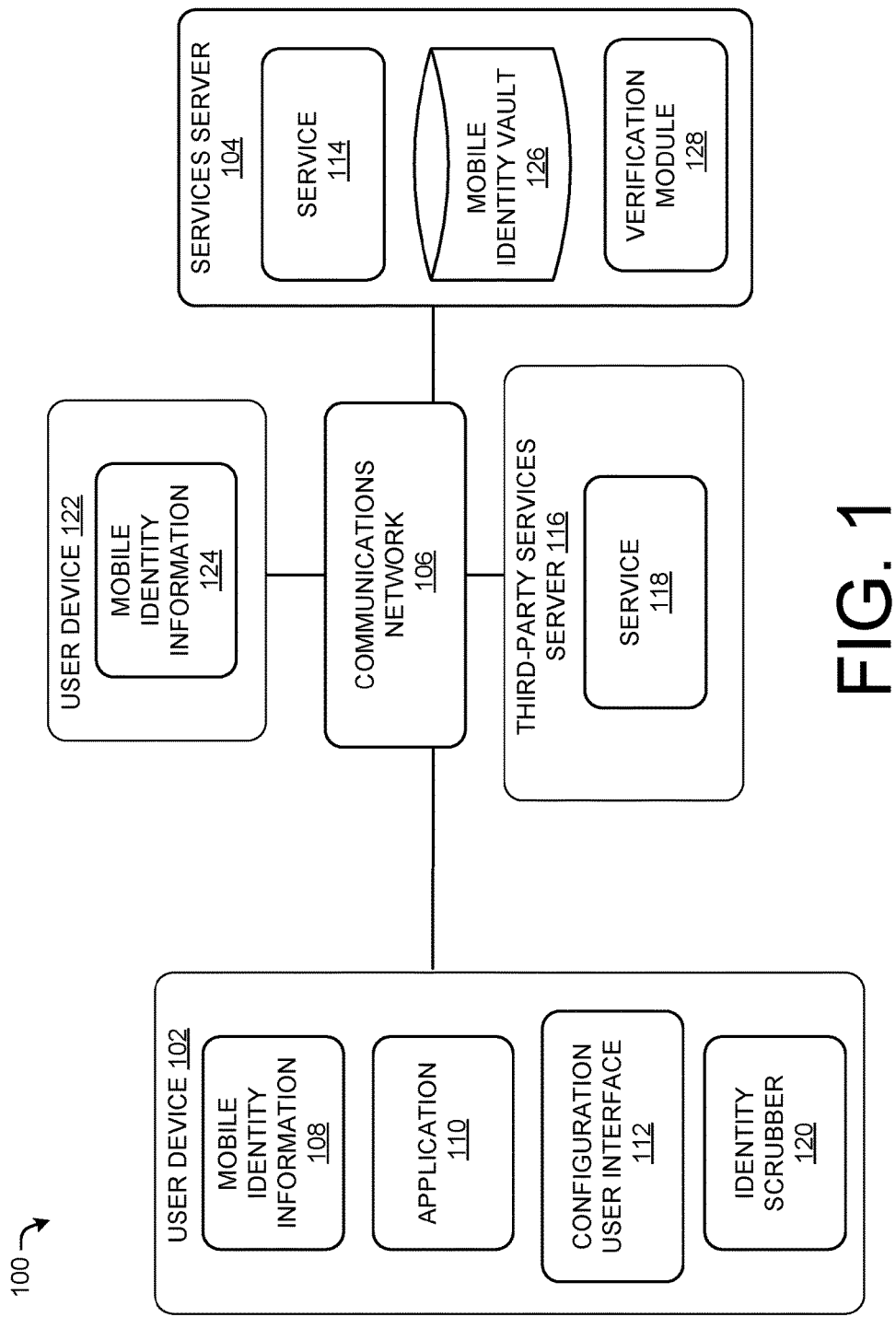
FIG. 1 illustrates an example environment.

Described herein are technologies to provide dynamic consuming and publishing of smart location information using a mobile identity. In some examples, a mobile device has stored thereon mobile identity information. The mobile identity information may be considered the mobile identity or the identity of the mobile device. When the mobile device is in a location in which a service is provided by a service provider, the mobile device uploads mobile identity data to establish a mobile identity with the service provider. In some examples, the location of the mobile device is detected by a service provider. The service provider, in some examples, requests mobile identity information from the mobile device upon detection of the mobile device in a location serviced by the service provider. In other examples, the mobile device determines that the mobile device is in a location serviced by the service provider and requests to transmit mobile identity information. Once the mobile identity information is received by the service provider, the service provider modifies the service based on the mobile identity information.

For example, the service provider can provide streaming music in an office, such as a physician's office. A patient may enter the physician's office for an appointment. Upon receiving a notification that a mobile device carried by the patient is located in the physician's office, mobile identity information may be provided to the service provider to configure the streaming music service being offered. For example and not by way of limitation, the mobile identity information can include genres of music that have played on the mobile device, indicating a preference for those genres of music by the user of the mobile device. In another example, the service provider can provide lighting services that control lighting in one or more spaces.

In some examples, using a mobile identity can provide various technical advantages over conventional systems. For example, there may be issues relating to privacy rights. In the example of the physician's office and the patient, the patient may not want a service provider knowing his or her identity upon entry into the physician's office. In conventional systems, if the patient wishes to have services configured specially for the patient, the patient will typically have to log into the service provider using identifying information.

However, in various configurations of the presently-disclosed subject matter, the mobile device itself is the identity, rather than the individual using the mobile device. The mobile identity information can be various configurations, preferences, and/or other characteristics "experienced" by the mobile device. The mobile device receives and stores various data to create the mobile identity information. In some examples, all personally-identifying information can be scrubbed, deleted, anonymized, or otherwise removed from the mobile identity information. In other examples, personally-identifying information can be filtered prior to the storage of data to create the mobile identity information. In still further examples, personally-identifying information can be part of the mobile identity information, but may be protected using various forms of security such as passwords, encryption, and the like.

FIG. 1 illustrates an example operation environment 100 to provide dynamic consuming and publishing of smart location information using a mobile identity. User device 102 may be a mobile device used by a user (not pictured). The user device 102 is capable of communicating with a services server 104 through communications network 106. The communications network 106 may vary depending on the communication connection initiated by the user device 102. For example, in some examples, the communications network 106 may be a cellular network including, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In some examples, the communications network 106 can include any network topologies including, but not limited to, 2G, 3G, 4G, 4G LTE, 5G, Wi-Fi, Bluetooth, Bluetooth Low Energy, and the like. In other examples, the communication network 106 can be wired or wireless Internet Protocol-based networks capable of establishing communication with the services server 104.

The user device 102 has stored thereon mobile identity information 108. The mobile identity information 108 can be a repository of various configurations, settings, and preferences that may be input by a user of the user device 102 or used by the user device 102 without input from the user. For example, the mobile identity information 108 can include a list of all genres of music played by application 110, which in this example is a music player installed on the user device 102. Thus, the mobile identity information 108 can include the genres of music played as well as an identification of the preferred or most played genres of music as well as other characteristics.

In another example, the application 110 can be a lighting program used to control the lights in a home. The lighting program can provide to the mobile identity information 108 the lighting schemes preferred by the user of the user device 102. For example, the lighting schemes can include lighting levels (e.g. dark, light) or lighting moods preferences (e.g. blue for a soothing mood).

In some examples, the mobile identity information 108 may include additional information not provided through the use of the application 110. In those examples, the additional information may be entered by a user using the configuration user interface 112. The configuration user interface 112 is a user interface that is designed to receive an input from a user regarding various preferences, settings, and the like that the user may want to have input as mobile identity information 108. The various inputs that may be used in the configuration user interface 112 can vary and can be updated.

For example, the location of the user device 102 may be detected, using various detection technologies, in certain locations. Some of the detection technologies can include, but are not limited to, near field detection, global positioning system, and multilateration of radio signals. These locations may be locations that the user frequents. For example, the locations may be work, home, a particular location of entertainment, and the like. The configuration user interface 112 may determine one or more services in the various locations. For example, the configuration user interface 112 may receive an input that a doctor's office the user frequents has a music service capable of receiving an input from the user device 102 of the mobile identity information 108. In this example, the configuration user interface 112 can query the services server 104 to receive one or more inputs to query the user. The configuration user interface 112, when rendered on the user device 102, can display the inputs to query and then provide the inputs to the mobile identity information 108. Thus, when in a location in which the mobile identity information 108 may be used, the mobile identity information 108 can be provide to the services server 104.

When the services server 104 receives mobile identity information 108 from the user device 102, the services server 104 reconfigures a service 114. As noted above, the service 114 can be various services such as music, lighting, communication settings, and the like. In some examples, the services server 104 is the device providing the service 114. In other examples, the services server 104 provides information to other services servers, such as third-party services server 116. In these examples, the third-party services server 116 can receive mobile identity information 108 from the user device 102 or can receive mobile identity information 108 from the services server 104 to provide a service 118. For example, the third-party services server 116 may be a local service not connected to a broader network. In other examples, the services server 104 can act as a cloud network servicing the user device 102.

As noted above, in some examples there may be issues in conventional systems with privacy. For example, in services provided in a doctor's office, it may be unlawful for a third-party, such as the services server 104 or the third-party services server 116, to know the identity of patients in the doctor's office. For example, in order to be compliant with the Health Insurance Portability and Accountability Act of 1996, identifying information about patients must be protected and not disclosed. There may be other instances in which personal identifying information needs to be, or is preferably, withheld from disclosure.

In these and other instances, there may be a desire to still use third-party services. In consideration of these and other examples, the user device 102 may initiate an identity scrubber 120. The identity scrubber 120 is an application that analyzes the mobile identity information 108, determines which information, either alone or in conjunction with other information, may constitute personal identifying information, and then acts to remove or replace the personal identifying information.

Personal identifying information can refer to data that may potentially be used to identify a specific individual. Information that may be personal identifying information may include, but is not limited to, (1) any information that can be used to distinguish or trace an individual's identity, such as name, social security number, date and place of birth, mother's maiden name, or biometric records; and (2) any other information that is linked or linkable to an individual, such as medical, educational, financial, and employment information. An example of personal identifying information that may be linkable is an Internet Protocol (IP) address, a MAC address, an IMEI number, a telephone number, and the like.

The identity scrubber 120 can be used before mobile identity information 108 is saved or before any mobile identity information 108 is provided to the services server 104 or the third-party services server 116. In other instances, the identity scrubber 120 can be used intermittently or on a scheduled basis to check the mobile identity information 108.

In some examples, the services server 104 or the third-party services server 116 can provide the service 114 or the service 118, respectively, to more than one user device. As illustrated in FIG. 1, the user device 122 can also access the services server 104 and/or the third-party services server 116. The user device 122 has stored thereon mobile identity information 124 used to access, for example, the service 118 provided by the third-party services server 116.

In instances in which the service 114 or the service 118 can accept inputs from more than one mobile device, the service 114 or the service 118 can use various algorithms to determine which mobile identity information to use for various configurations. First, the service 114 or the service 118 can determine if the mobile identity information 108 and the mobile identity information 124 are the same. If the mobile identity information 108 and the mobile identity information 124 are the same, then the service, such as the service 118, can accept both the mobile identity information 108 and the mobile identity information 124.

If the mobile identity information 108 and the mobile identity information 124 are not the same, the service 118, for example, can determine if the mobile identity information 108 and the mobile identity information 124 conflict. For example, the mobile identity information 108 may be related to music volume and the mobile identity information 124 may be related to music genre. These inputs do not necessarily conflict, and thus, both the mobile identity information 108 and the mobile identity information 124 may be used.

If the mobile identity information 108 and the mobile identity information 124 are not the same and do conflict, for example, different types of music genres, the service 118 can determine which of the mobile identity information 108 and the mobile identity information 124 to use. For example, the service 118 can make a determination to use the mobile identity information 108 because the user device 102 was first detected, thus giving the user device 102 priority over the later entering user device 122. In another example, the service 118 can make a determination to use the mobile identity information 108 because the mobile identity information 108 includes information that a user associated with the user device 102 has paid for special privileges, such as paying for the service 118 or being a subscriber to a particular cellular network, for example.

In some examples, the service 118, when presented with conflicting mobile identity information 108 and mobile identity information 124, can resolve the conflict by determining a substitute suitable for each. For example, the mobile identity information 108 can be a music genre of hard rock and the mobile identity information 124 can be a music genre of soft rock. A resolution can be a type of music between hard rock and soft rock. In another example, the mobile identity information 108 can be a light setting of "brightly lit bulbs" and the mobile identity information 124 can be a light setting of "dimly lit bulbs. A resolution can be medium lit bulbs.

In some examples, the services server 104 can store multiple instances of mobile identity information from multiple user devices. For example, the services server 104 can be a system that serves more than one user device. In one example, the services server 104 can be part of a cloud-based web services platform or a cellular network. The services server 104 can store the mobile identity information 108 of the user device 102 and the mobile identity information 124 of the user device 122 in the mobile identity vault 126.

The mobile identity vault 126 can serve various purposes. For example, in instances in which it is not possible or desirable for the user device 102 or the user device 122 to provide their respective mobile identity information to the third-party services server 116 or the services server 104, the services server 104 can identify the user device 102 or the user device 122, access the mobile identity vault 126, determine if mobile identity information related to the particular service has been stored in the mobile identity vault 126, and then provide the mobile identity information to either service 114 or service 118.

There may be various reasons why the user device 102 or the user device 122 cannot provide their respective mobile identity information to the third-party services server 116 or the services server 104. For example, the user device 102 may be detected to be in a location in which the service 118 is provided by the third-party services server 116, but the user device 102 is unable to establish a communication connection with the third-party services server 116. In these types of examples, the third-party services server 116 can receive a notification that the user device 102 is in a location in which the third-party services server 116 provides the service 118.

The third-party services server 116 can query the user device 102 for the mobile identity information 108. If the mobile identity information 108 is not received within a predetermined amount of time, or a connection error is received by the third-party services server 116, the third-party services server 116 can query the services server 104. The services server 104 receives the query and then transmits to the third-party services server 116 mobile identity information 108 if stored in the mobile identity vault 126.

As noted above, privacy concerns may be an issue. In addition to other technologies for protecting the identity of an individual while still allowing the individual to use various services, such as the identity scrubber 120, a verification module 128 may be used. In some examples, services such as the service 118 or the service 114 may require that a user authenticate themselves. In these examples, even though the service may use the mobile identity information 108, the service may require an additional level of authentication. In these and other examples, the verification module 128 may authenticate a user. For example, the third-party services server 116 may receive a notification or detect that the user device 102 is in a location in which the service 118 may be provided. The user device 102 can transmit the mobile identity information 108 to the third-party services server 116. However, the third-party services server 116 may need an additional verification of the identity of the user of the user device 102. In this example, the verification module 128 can query the user device 102 and request an identification of the user (such as entering a password, code or the like). The verification module 128 receives the identification information, authenticates the user, and then transmits to the third-party services server 116 a notification that the user has been authenticated. In this manner, the identity of the user is not provided to the third-party services server 116, thus increasing the protection level of the user's identity.

Figure 2:
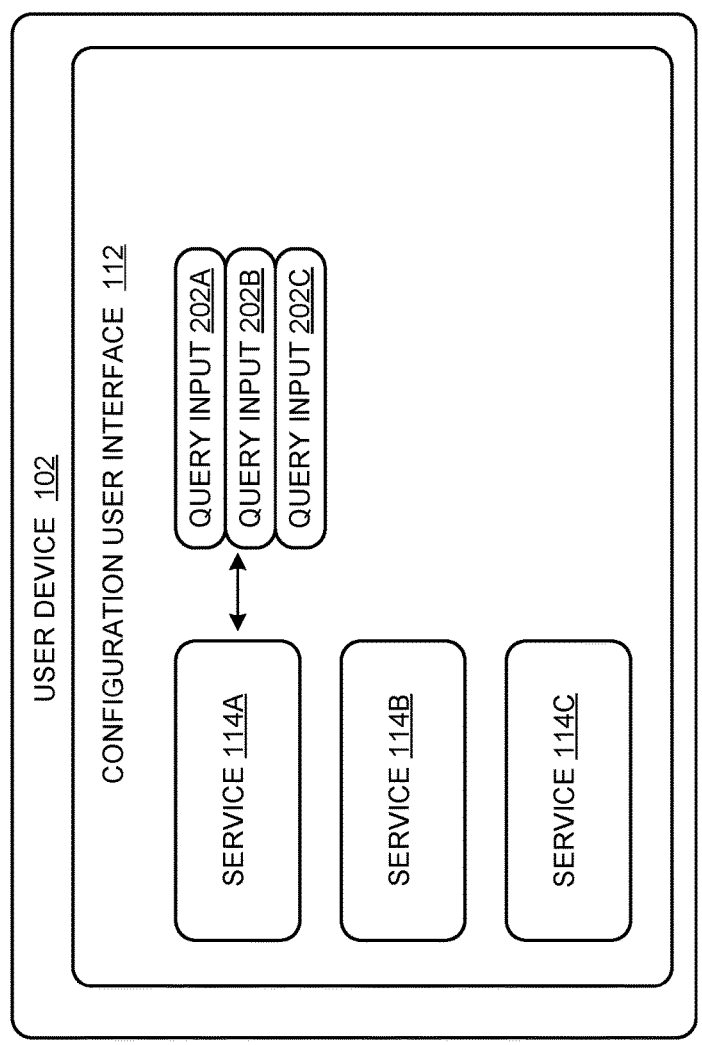
FIG. 2 illustrates a user interface for receiving mobile identity information.

FIG. 2 illustrates the configuration user interface 112 rendered on the user device 102 that may be used to query a user for preferences, setpoints of variables, and the like relating to various services, such as services 114A, 114B, and 114C. The services 114A, 114B, and 114C may be various services that may be provided when the user device 102 is detected to be in a location in which one or more of the services 114A, 114B, and 114C are provided.

The service 114A interface can receive an input to provide a user with query inputs 202A-202C. The query inputs 202A-202C can be various settings, preferences, and the like that may enhance or enable the service 114A. When the service 114A interface receives a selection input, the configuration user interface 112 may render the query inputs 202A-202C. The query inputs 202A-202C are received and stored as the mobile identity information 108 of the user device 102. Similar query inputs can be received for the services 114B and 114C.

Figure 3:
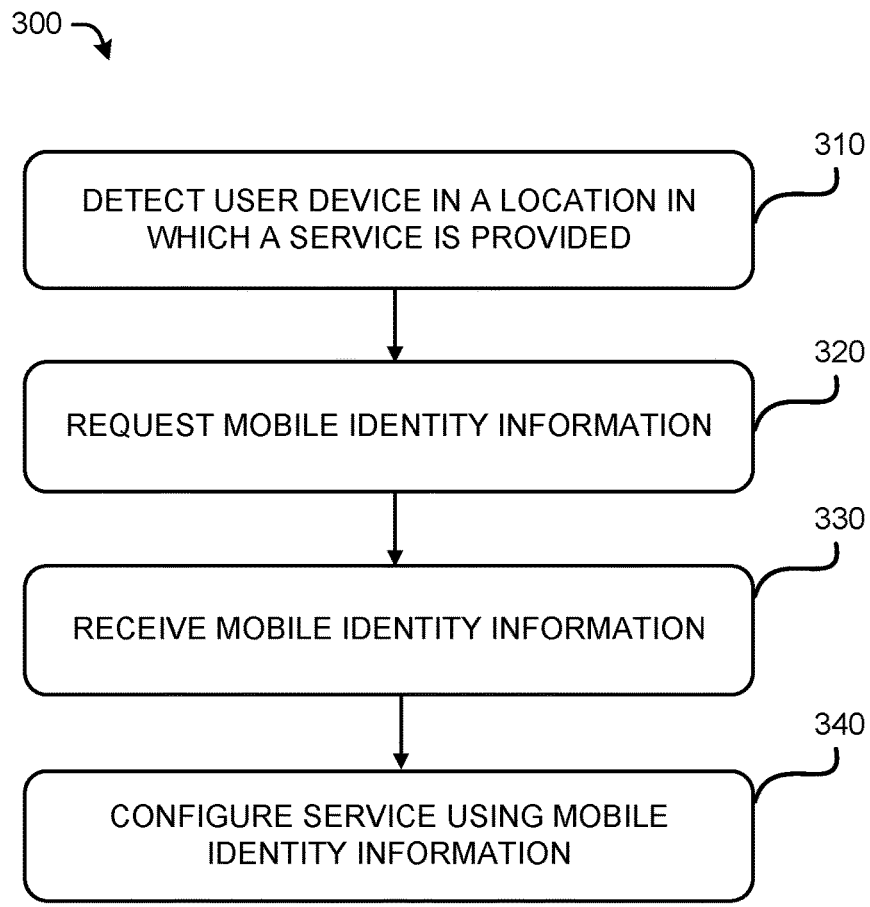
FIG. 3 illustrates an example process for providing dynamic consuming and publishing of smart location information using a mobile identity.

FIG. 3 is an illustrative process 300 for providing dynamic consuming and publishing of smart location information using a mobile identity. The process is illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 3, the providing dynamic consuming and publishing of smart location information using a mobile identity process 300 commences at operation 310, where the user device 102 is detected in a location serviced by the service 114 or the service 118. The type of services may vary. For example, the service 114 can be a music playing service. In other examples, the service 114 can be a lighting service. These and other types of services are considered to be within the scope of the presently disclosed subject matter.

The process 300 may continue to operation 320, where the mobile identity information 108 is requested. In some examples, the mobile identity information 108 is requested by the service 114. In other examples, the mobile identity information 108 is requested by the user device 102 when the user device 102 receives a notification from the service 114 that the mobile identity information 108 is requested.

The mobile identity information 108 may be requested in other manners, which are considered to be within the scope of the presently disclosed subject matter. In still other examples, the mobile identity information 108 may be provided automatically prior to a request.

The process 300 continues to operation 330, where the mobile identity information 108 is received. In some examples, the mobile identity information 108 can be received from the user device 102. In other examples, the mobile identity information 108 can be received from other sources, such as the mobile identity vault 126.

The process 300 continues to operation 340, where the service 114 is configured using the mobile identity information 108. The service 114 can be configured while the user is in the location. Once the user leaves, the service 114 can be configured for another user or can be reset to a default value. For example, a particular music genre may be selected and played. In another example, a lighting configuration may be implemented.

Figure 4:
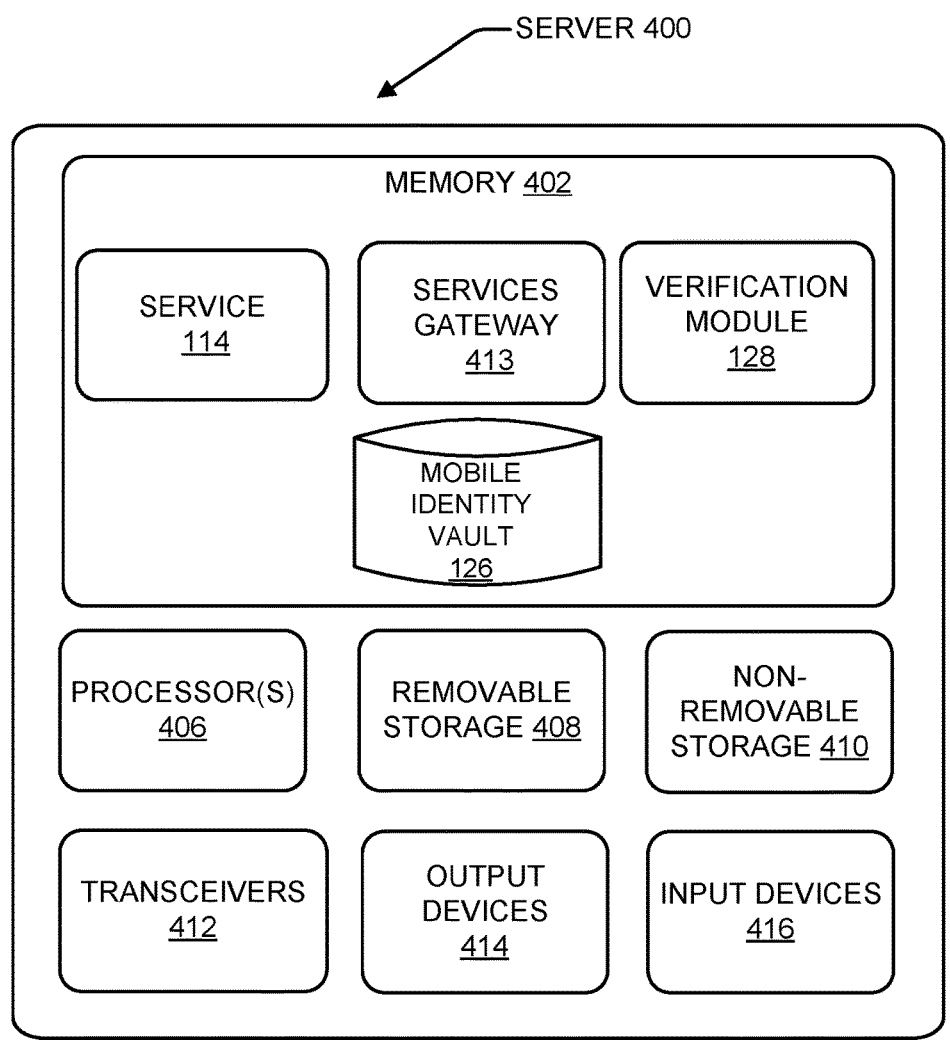
FIG. 4 illustrates a component level view of a server configured for use within a wireless communication network in order to provide various services within a wireless communication network.

FIG. 4 illustrates a component level view of a server 400, such as the services server 104 or the third-party services server 116, configured for use within a wireless communication network in order to provide various services within the wireless communication network, such as the service 114, the mobile identity vault 126, the verification module 128, and a services gateway 413. The services gateway 413 can verify a user's registration to allow the use of the mobile identity information 108. Once the user's registration is verified, the services gateway 413 can generate an authorization token for the user. The token can be sent to the user device 102 using an encrypted Session Initiation Protocol (SIP). When the user wants to access an online application program, such as the service 114, a program or browser running on the communication device generates an HTTP or HTTPS request to a services gateway (SG). (Note that that where "HTTP" is used herein, the system may also represent secure HTTP communications using encryption or HTTPS). Additional details of the server 400 may be found in the U.S. Pat. No. 8,762,559, entitled "System and Method for Non-IMS Application Service Access Over IP Multimedia Subsystem," filed on Dec. 16, 2011, which is herein incorporated by reference in its entirety.

In some examples, the server 400 can comprise or perform functionality similar to the services server 104 and/or the third-party services server 116. The server 400 may be located in a radio network controller ("RNC") or gateway. Additionally, the server 400 may be a separate entity located separately from the RNC or gateway. As illustrated, the server 400 comprises a system memory 402 storing computer-executable instructions to implement the service 114, the mobile identity vault 126, the verification module 128, and a services gateway 413. The system memory 402 may also store additional applications, data, or programs, such as the mobile identity vault 126. Also, the server 400 includes processor(s) 406, a removable storage 408, a non-removable storage 410, transceivers 412, output device(s) 414, and input device(s) 416.

In various implementations, system memory 402 is volatile (such as RAM), non-volatile (such as ROM, flash memory, etc.) or some combination of the two. In some implementations, the processor(s) 406 is a central processing unit (CPU), a graphics processing unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 408 and non-removable storage 410.

Non-transitory computer-readable media may include volatile and nonvolatile, removable and non-removable tangible, physical media implemented in technology for storage of information, such as computer readable instructions, data structures, program modules, or other data. System memory 402, removable storage 408 and non-removable storage 410 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 412 include any sort of transceivers known in the art. For example, the transceivers 412 may include wired communication components, such as an Ethernet port, for communicating with other networked devices. Also, or instead, the transceivers 412 may include wireless modem(s) that may facilitate wireless connectivity with other computing devices. Further, the transceivers 412 may include a radio transceiver that performs the function of transmitting and receiving radio frequency communications via an antenna.

In some implementations, the output devices 414 include any sort of output devices known in the art, such as a display (e.g., a liquid crystal display), speakers, a vibrating mechanism, or a tactile feedback mechanism. Output devices 414 also include ports for one or more peripheral devices, such as headphones, peripheral speakers, or a peripheral display.

In various implementations, input devices 416 include any sort of input devices known in the art. For example, input devices 416 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, the method comprising:
   detecting a user device in a location in which a service is provided;
   requesting mobile identity information from the user device;
   receiving mobile identity information;
   comparing the mobile identity information of the user device to a second mobile identity information of a second user device;
   determining that the mobile identity information and the second mobile identity information conflict;
   determining which of the mobile identity information and the second mobile identity information to use when the mobile identity information and the second mobile identity information conflict; and configuring the service while the user is in the location based on the determined mobile identity information or second mobile identity information.

2. The method of claim 1, wherein the service is a streaming music service and the mobile identity information comprises a genre of music played on the user device.

3. The method of claim 1, further comprising scrubbing personal identifying information from the mobile identity information.

4. The method of claim 1, wherein the mobile identity information is received from the user device.

5. The method of claim 1, wherein the mobile identity information is received from a services server, and wherein the mobile identity information is stored in a mobile identity vault.

6. The method of claim 1, wherein determining which of the mobile identity information and the second mobile identity information to use if the mobile identity information and the second mobile identity information conflict comprises:
   determining which of the mobile identity information and the second mobile identity information was received first; and
   using the mobile identity information if the mobile identity information was received first and using the second mobile identity if the second mobile identity information was received first.

7. The method of claim 1, further comprising authenticating a user of the user device and transmitting an authentication notice to the service indicating that the user is authenticated.

8. A non-transitory computer-readable storage medium having computer-executable instructions stored thereupon that, when executed by a computer, cause the computer to:
   detect a user device in a location in which a service is provided;
   request mobile identity information from the user device;
   receive mobile identity information;
   compare the mobile identity information of the user device to a second mobile identity information of a second user device;
   determine if the mobile identity information and the second mobile identity information conflict;
   configure the service using both the mobile identity information and the second mobile identity information if the mobile identity information and the second mobile identity information do not conflict; and
   determine which of the mobile identity information and the second mobile identity information to use if the mobile identity information and the second mobile identity information conflict; and
   configure the service based on the mobile identity information.

9. The non-transitory computer-readable storage medium of claim 8, wherein the service is a streaming music service and the mobile identity information comprises a genre of music played on the user device.

10. The non-transitory computer-readable storage medium of claim 8, further comprising computer-executable instructions that, when executed by the computer, cause the computer to scrub personal identifying information from the mobile identity information.

11. The non-transitory computer-readable storage medium of claim 8, wherein the mobile identity information is received from the user device.

12. The non-transitory computer-readable storage medium of claim 8, wherein the mobile identity information is received from a services server, wherein the mobile identity information is stored in a mobile identity vault.

13. The non-transitory computer-readable storage medium of claim 8, wherein the computer-executable instructions to determine which of the mobile identity information and the second mobile identity information to use if the mobile identity information and the second mobile identity information conflict further comprise computer-executable instructions that, when executed by the computer, cause the computer to:
   determine which of the mobile identity information and the second mobile identity information was received first; and
   use the mobile identity information if the mobile identity information was received first and using the second mobile identity if the second mobile identity information was received first.

14. The non-transitory computer-readable storage medium of claim 8, further comprising computer-executable instructions that, when executed by the computer, cause the computer to authenticate a user of the user device and transmitting an authentication notice to the service if the user is authenticated.

15. A system, comprising:
   a non-transitory storage medium; and
   computer-executable instructions stored in the non-transitory storage medium that, when executed by a computer, cause the computer to:
   detect a user device in a location in which a service is provided;
   request mobile identity information from the user device;
   receive mobile identity information;
   compare the mobile identity information of the user device to a second mobile identity information of a second user device;
   determine if the mobile identity information and the second mobile identity information conflict;
   configure the service using both the mobile identity information and the second mobile identity information if the mobile identity information and the second mobile identity information do not conflict;
   determine which of the mobile identity information and the second mobile identity information to use if the mobile identity information and the second mobile identity information conflict; and
   configure the service based on the mobile identity information.

16. The system of claim 15, further comprising computer-executable instructions that, when executed by the computer, cause the computer to scrub personal identifying information from the mobile identity information.

17. The system of claim 15, wherein the computer-executable instructions to determine which of the mobile identity information and the second mobile identity information to use if the mobile identity information and the second mobile identity information conflict further comprise computer-executable instructions that, when executed by the computer, cause the computer to:
   determine which of the mobile identity information and the second mobile identity information was received first; and
   use the mobile identity information if the mobile identity information was received first and using the second mobile identity if the second mobile identity information was received first.

18. The system of claim 15, further comprising computer-executable instructions that, when executed by the computer, cause the computer to authenticate a user of the user device and transmit an authentication notice to the service indicating that the user is authenticated.

* * * * *